United States Patent
Katoh et al.

(10) Patent No.: US 10,696,245 B2
(45) Date of Patent: Jun. 30, 2020

(54) POWER SUPPLY DEVICE

(71) Applicant: Yazaki Corporation, Tokyo (JP)

(72) Inventors: Mitsunobu Katoh, Makinohara (JP); Masaki Yokoyama, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/414,959

(22) Filed: May 17, 2019

(65) Prior Publication Data

US 2019/0389401 A1 Dec. 26, 2019

(30) Foreign Application Priority Data

Jun. 21, 2018 (JP) ................. 2018-118081

(51) Int. Cl.
*B60R 16/02* (2006.01)
*B60R 16/027* (2006.01)

(52) U.S. Cl.
CPC ........ *B60R 16/0215* (2013.01); *B60R 16/027* (2013.01)

(58) Field of Classification Search
CPC .............................................. B60R 16/0215
USPC ...................................... 174/72 A
See application file for complete search history.

(56) References Cited

U.S. PATENT DOCUMENTS

| | | | |
|---|---|---|---|
| 9,738,240 B2* | 8/2017 | Kogure | B60R 16/027 |
| 2015/0325989 A1* | 11/2015 | Sekino | H02G 3/0468 174/68.3 |
| 2017/0050589 A1* | 2/2017 | Kimura | B60R 16/027 |
| 2017/0297515 A1 | 10/2017 | Sekino et al. | |

FOREIGN PATENT DOCUMENTS

| | | |
|---|---|---|
| JP | 2007-112376 A | 5/2007 |
| JP | 2017-192258 A | 10/2017 |

* cited by examiner

*Primary Examiner* — Stanley Tso
(74) *Attorney, Agent, or Firm* — Sughrue Mion, PLLC

(57) ABSTRACT

An object of the present invention is to provide a power supply device that suppresses deformation of an exterior member. A power supply device is an apparatus for supplying power from a vehicle body to a sliding door. The power device includes: an exterior member, a vehicle-body-side holding portion for holding one end of the exterior member, and a door-side holding portion for holding the other end of the exterior member. The power supply device further includes: a connecting portion that can connect and disconnect the vehicle-body-side holding portion and the door-side holding portion while bending the exterior member in a state in which the vehicle-body-side holding portion holds the one end of the exterior member and the door-side holding portion holds the other end of the exterior member.

4 Claims, 8 Drawing Sheets

POWER SUPPLY DEVICE

TECHNICAL FIELD

The present invention relates to a power supply device.

BACKGROUND ART

Generally, a vehicle equipped with a sliding door is provided with a power supply device for supplying electric power from a vehicle body to a sliding door (for example, refer to Patent Literature 1). That is, a battery or the like mounted on the vehicle body and electrical components provided on the sliding door are electrically connected by a wire harness of the power supply device so that electric power is supplied. One end of the wire harness of such a power supply device is swingably supported by a vehicle-body-side protector and the other end is swingably supported by a sliding-door-side protector.

PRIOR ART DOCUMENT

Patent Literature

Patent Literature 1: JP 2017-192258 A

SUMMARY OF INVENTION

Technical Problem

However, in the conventional power supply device, an exterior member of a wire harness may be damaged in some cases before being mounted on the vehicle main body, for example, while transporting from a manufacturing factory to an assembling factory or when a worker grasps a wire harness from a returnable box and takes out the wire harness in an assembling factory.

An object of the present invention is to provide a power supply device that suppresses deformation of an exterior member.

Solution to Problem

According to a first aspect of the present invention, there is provided a power supply device for supplying power from a vehicle body to a sliding door including:
   a tubular exterior member;
   a vehicle-body-side holding portion for holding one end of the exterior member; and
   a door-side holding portion for holding the other end of the exterior member,
   wherein the power supply device further includes: a connecting portion that can connect and disconnect the vehicle-body-side holding portion and the door-side holding portion while bending the exterior member in a state in which the vehicle-body-side holding portion holds the one end of the exterior member and the door-side holding portion holds the other end of the exterior member.

According to a second aspect of the present invention, there is provided the power supply device according to the first aspect,
   wherein the exterior member is curved such that an axis of the exterior member is located on the same plane in a state in which the vehicle-body-side holding portion and the door-side holding portion are connected by the connecting portion.

According to a third aspect of the present invention, there is provided the power supply device according to the first or second aspect,
   wherein the exterior member is provided with a corrugated guide which is externally mounted on an electric wire and which allows the electric wire to be bent in a predetermined allowable direction and regulates a curvature exceeding a predetermined limit state in a restricting direction which is an opposite side, and
   wherein the exterior member is provided so as to be curved in the allowable direction in a state in which the vehicle-body-side holding portion and the door-side holding portion are connected by the connecting portion.

Effect of the Invention

According to the first aspect of the present invention, the power supply device further includes: a connecting portion that can connect and disconnect the vehicle-body-side holding portion and the door-side holding portion while bending the exterior member in a state in which the vehicle-body-side holding portion holds the one end of the exterior member and the door-side holding portion holds the other end of the exterior member. According to this, the exterior member is held in a curved state by the vehicle-body-side holding portion and the door-side holding portion. That is, since the rigidity of the exterior member can be obtained by holding the exterior member in a curved state, it is possible to suppress the deformation of the exterior member at the time of transportation or when the operator grips and removes the exterior member from the returnable box.

DESCRIPTION OF EMBODIMENTS

Hereinafter, an embodiment of the present invention will be described with reference to FIGS. 1 to 12.

Figure 1:
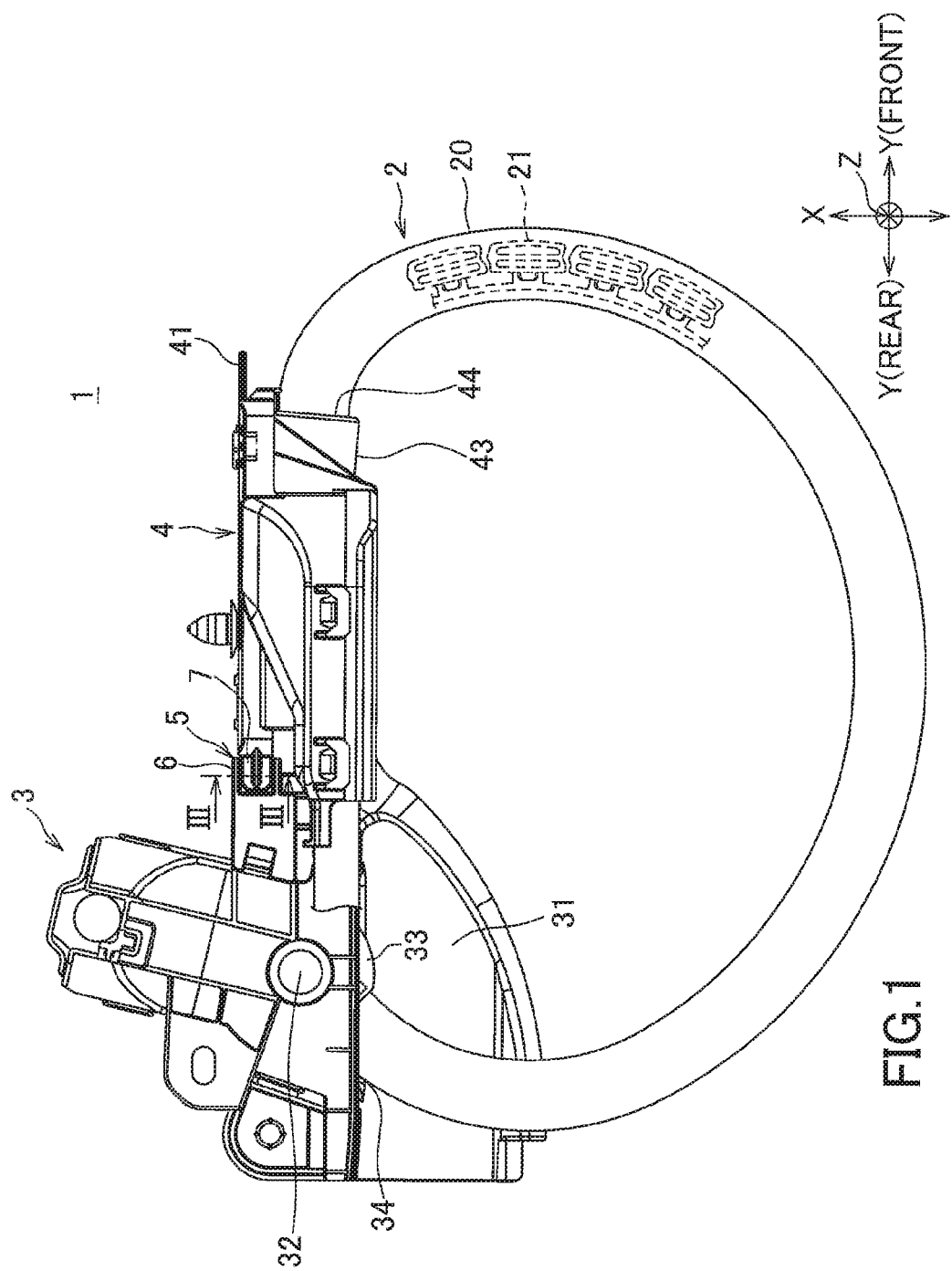
FIG. 1 is a plan view showing a power supply device according to an embodiment of the present invention.

As shown in FIG. 1, in the vehicle having a vehicle body (vehicle main body) and a sliding door, a power supply device 1 electrically connects them via a wire harness 2 arranged between the vehicle body and the sliding door. FIG. 1 is a plan view showing a load state of the power supply device 1 according to the embodiment of the present invention. The "load state of the power supply device 1" in the present embodiment is, for example, a form of the power supply device 1 when accommodated in a returnable box for transporting from a manufacturing factory to an assembling factory.

Figure 2:
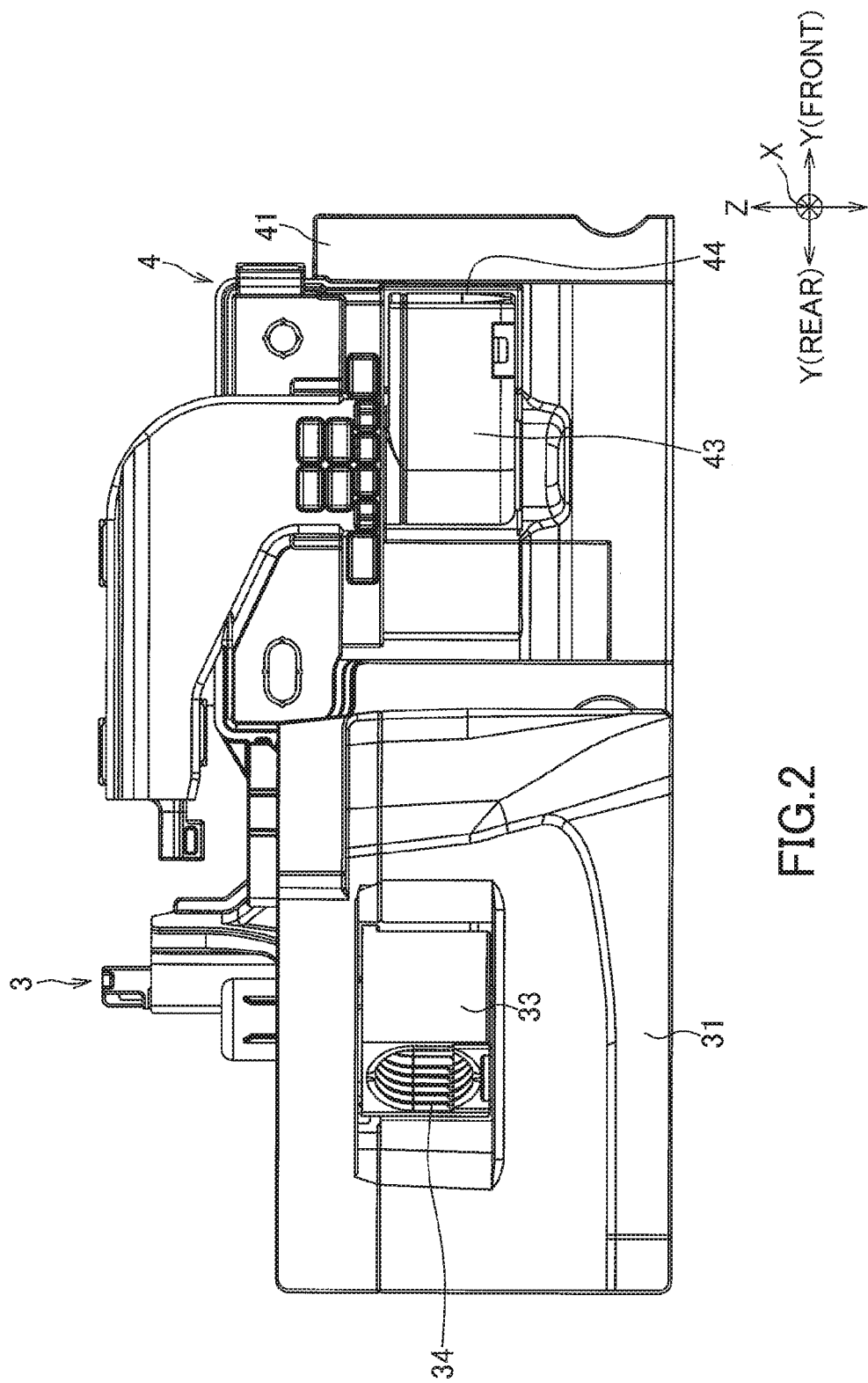
FIG. 2 is a side view showing the power supply device.

In the power supply device 1, electric power is supplied from a power supply (not shown) provided in the vehicle body to an electric device (not shown) provided in the sliding door via the wire harness 2. As shown in FIGS. 1 and 2, this power supply device 1 includes a vehicle-body-side holding portion 3, a door-side holding portion 4, and a connecting portion 5 (shown in FIG. 1) capable of connecting and disconnecting the vehicle-body-side holding portion 3 and a door-side holding portion 4. In FIG. 2, the wire harness 2 is omitted. Incidentally, in FIG. 1 and the like, a separation direction between the vehicle body and the sliding door may be indicated by an arrow X (may be referred to as a left-right direction), a connecting and disconnecting direction of the vehicle-body-side holding portion 3 and the door-side holding portion 4 and an opening and closing direction of the sliding door may be indicated by an arrow Y (may be referred to as front and rear direction), and a direction orthogonal to the arrows X and Y may be indicated by an arrow Z (may be referred to as a height direction). Among the arrows Y, a side where the door-side holding portion 4 is positioned viewed from the vehicle-body-side holding portion 3 may be referred to as "front", a side where the vehicle-body-side holding portion 3 is positioned viewed from the door-side holding portion 4 may be referred to as "rear".

Figure 3:
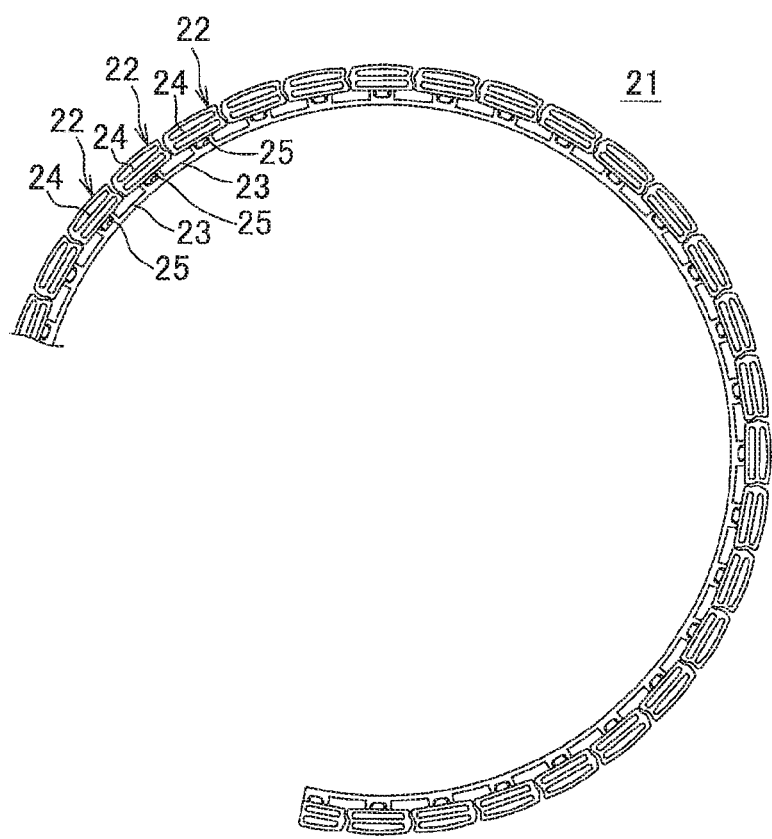
FIG. 3 is a plan view showing an exterior member arranged between a vehicle-body-side holding portion and a door-side holding portion.

In the wire harness 2, a part of a not shown wire bundle (electric wire) in which a plurality of electric wires are bundled is passed through a resin corrugated tube 20 (exterior member). A portion between the vehicle body and the sliding door of the electric wire bundle is passed through the corrugated tube 20. Further, as shown in FIG. 3, the wire harness 2 has a corrugated guide 21 surrounding the wire bundle inside the corrugated tube 20 and guiding the bending of the bundle of electric wires and the corrugated tube 20. The corrugated guide 21 has substantially the same length as the corrugated tube 20.

As shown in FIG. 3, the corrugated guide 21 includes a plurality of members 22 arranged in an axial direction of the wire bundle and elongated members 23 supporting the plurality of members 22 at equal intervals. Each of the members 22 has a pair of opposed walls 24, 24 for positioning the wire bundle therebetween and a connecting wall 25 connecting the pair of opposing walls 24, 24, and is formed in a substantially U-shape. Such a corrugated guide 21 allows bending in an allowable direction accompanying opening and closing movements of the sliding door. In addition, when the corrugated guide 21 is bent in a regulating direction, the adjacent opposing walls 24 abut on each other, thereby regulating the bending exceeding a predetermined limit state in the regulating direction.

Figure 4:
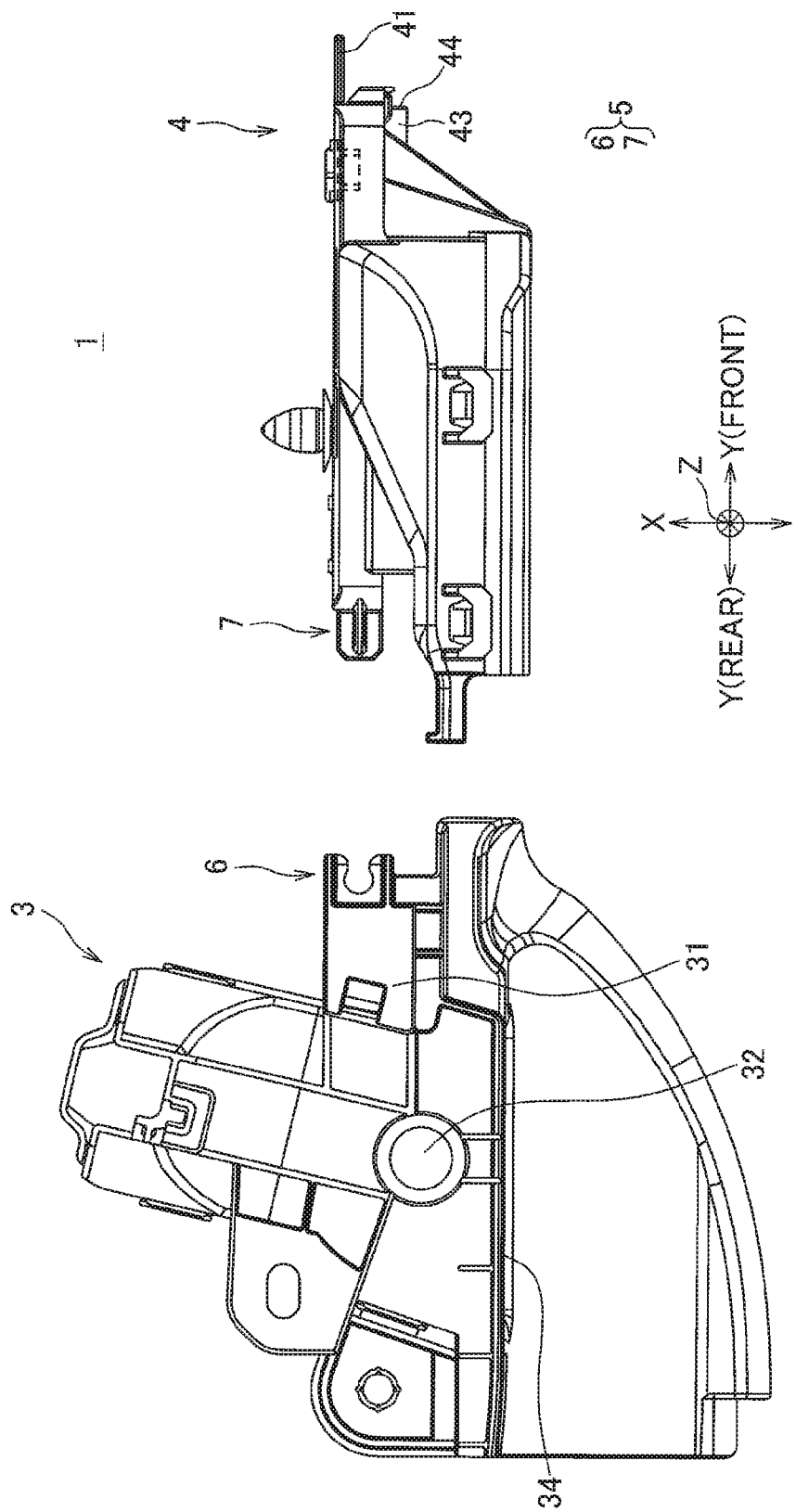
FIG. 4 is a view showing a state in which the vehicle-body-side holding portion and the door-side holding portion constituting the power feeding device are connected by a connecting portion.

As shown in FIGS. 1 and 4, the vehicle-body-side holding portion 3 includes a vehicle-body-side support member 31 and a vehicle-body-side rocking member 33 (shown in FIG. 1) having a vehicle-body-side rocking shaft 32. The vehicle-body-side support member 31 is provided in a plate shape and is fixed in a manner facing a frame (not shown) of the vehicle body. As shown in FIG. 2, the vehicle-body-side rocking member 33 has a vehicle-body-side harness holding portion 34 that holds an end portion on the vehicle body side of the corrugated tube 20. The vehicle-body-side rocking member 33 is mounted on the vehicle so that the vehicle-body-side harness holding portion 34 faces the sliding door side (one end side in the X direction of the vehicle-body-side support member 31). Further, in a state of being mounted on the vehicle, the vehicle-body-side rocking member 33 is swingably supported by the support member 31 in the opening and closing direction (Y direction) of the sliding door around the vehicle-body-side rocking shaft 32 having the Z direction as the axial direction. Here, as shown in FIGS. 1 and 2, in the load state of the power supply device 1, the vehicle-body-side rocking member 33 is set to be oriented such that the vehicle-body-side harness holding portion 34 faces the other end side in the X direction of the vehicle-body-side support member 31.

As shown in FIGS. 1 and 4, the door-side holding portion 4 includes a door-side support member 41 and a door-side rocking member 43 having a door-side rocking shaft (not shown). The door-side support member 41 is fixed to a door panel (not shown) of the sliding door. The door-side rocking member 43 has a door-side harness holding portion 44 that holds a door-side end portion of the corrugated tube 20. Further, in a state mounted on the vehicle, the door-side rocking member 43 is swingably supported in the opening and closing direction (Y direction) of the sliding door about the door-side rocking axis having the Z direction as the axial direction by the door-side support member 41. That is, the door-side harness holding portion 44 is provided so as to be swingable around a door-side rocking axis having the Z direction as the axial direction from a position facing the front end in the Y direction of the door-side support member 41 to a position facing the rear end in the Y direction. Here, as shown in FIGS. 1 and 2, in the load state of the power supply device 1, the door-side rocking member 43 is shaped such that the door-side harness holding portion 44 faces the front end side in the Y direction of the door-side support member 41.

As shown in FIG. 4, the connecting portion 5 includes a vehicle-body-side engaging portion 6 provided in the vehicle-body-side holding portion 3, a door-side engaged portion 7 provided in the door-side holding portion 4 and capable of engaging with the vehicle-body-side engaging portion 6. The axes of the corrugated tube 20 held by the vehicle-body-side harness holding portion 34 and the door-side harness holding portion 44 are curved in the allowable direction so as to be located on the same plane (XY direction) in a state where the vehicle-body-side engaging portion 6 and the door-side engaged portion 7 are engaged with each other. That is, as shown in FIG. 2, the vehicle-body-side harness holding portion 34 and the door-side harness holding portion 44 have the same height (Z direction) in a state where the vehicle-body-side engaging portion 6 and the door-side engaged portion 7 are engaged with each other.

As shown in FIG. 4, the vehicle-body-side engaging portion 6 is provided at a corner portion on one end side in the X direction and on the front side in the Y direction of the vehicle-body-side support member 31.

Figure 5:
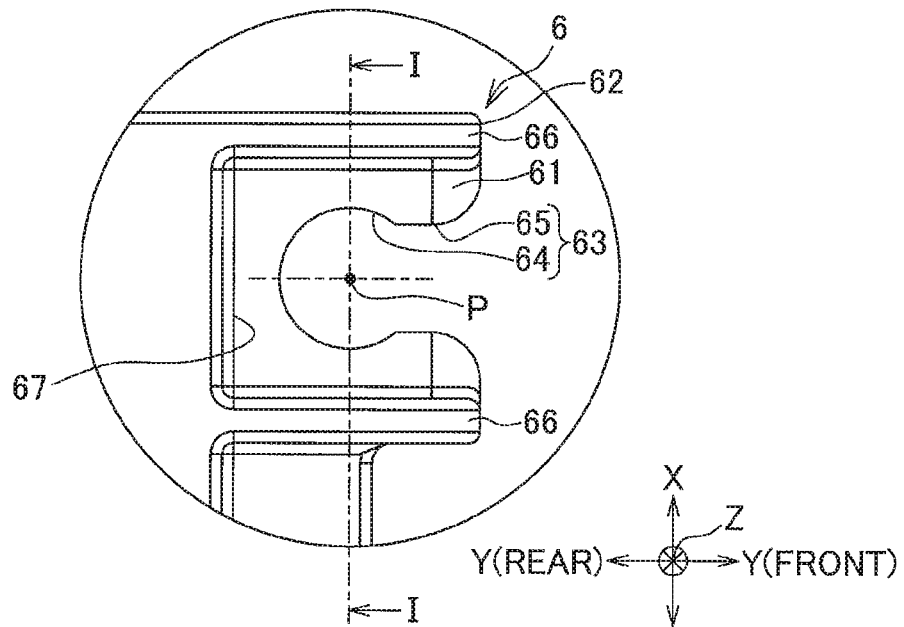
FIG. 5 is a plan view showing a vehicle-body-side engaging portion provided in the vehicle-body-side holding portion.
Figure 6:
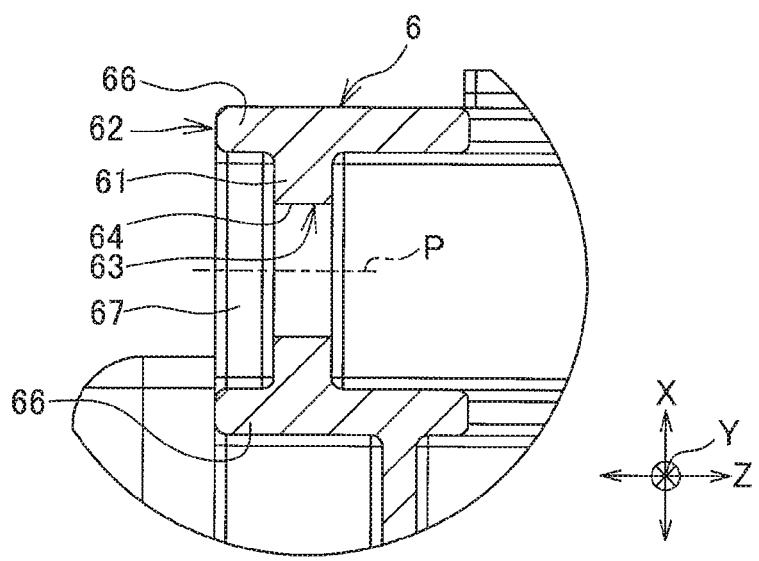
FIG. 6 is a cross-sectional view taken along line I-I in FIG. 5.

As shown in FIGS. 5 and 6, the vehicle-body-side engaging portion 6 includes an insertion hole 63 into which a cylindrical portion 71 of a door-side engaged portion 7 described later is inserted, a rectangular plate-shaped portion 61, and an enclosing wall 62 surrounding three sides of the plate-shaped portion 61 excluding a front side in the Y direction. The plate-shaped portion 61 is provided so as to extend in a direction orthogonal to the Z direction. The insertion hole 63 includes a circular portion main body 64 having a center P as a shaft (Z direction), an entrance portion 65 formed by cutting out from the circular portion main body 64 to a front end portion in the Y direction of the plate-shaped portion 61. The enclosing wall 62 has a pair of left and right walls 66, 66 standing from each end portion in the X direction of the plate-shaped portion 61, a rear wall 67 standing from a rear end portion in the Y direction of the plate-shaped portion 61. The pair of left and right walls 66, 66 and the rear wall 67 are provided so as to extend upward and downward in the Z direction of the plate-shaped portion 61. That is, as shown in FIG. 6, the plate-shaped portion 61 is provided at a position spaced apart downward by a predetermined dimension from the upper ends of the pair of right and left walls 66, 66 and the rear wall 67.

Figure 7:
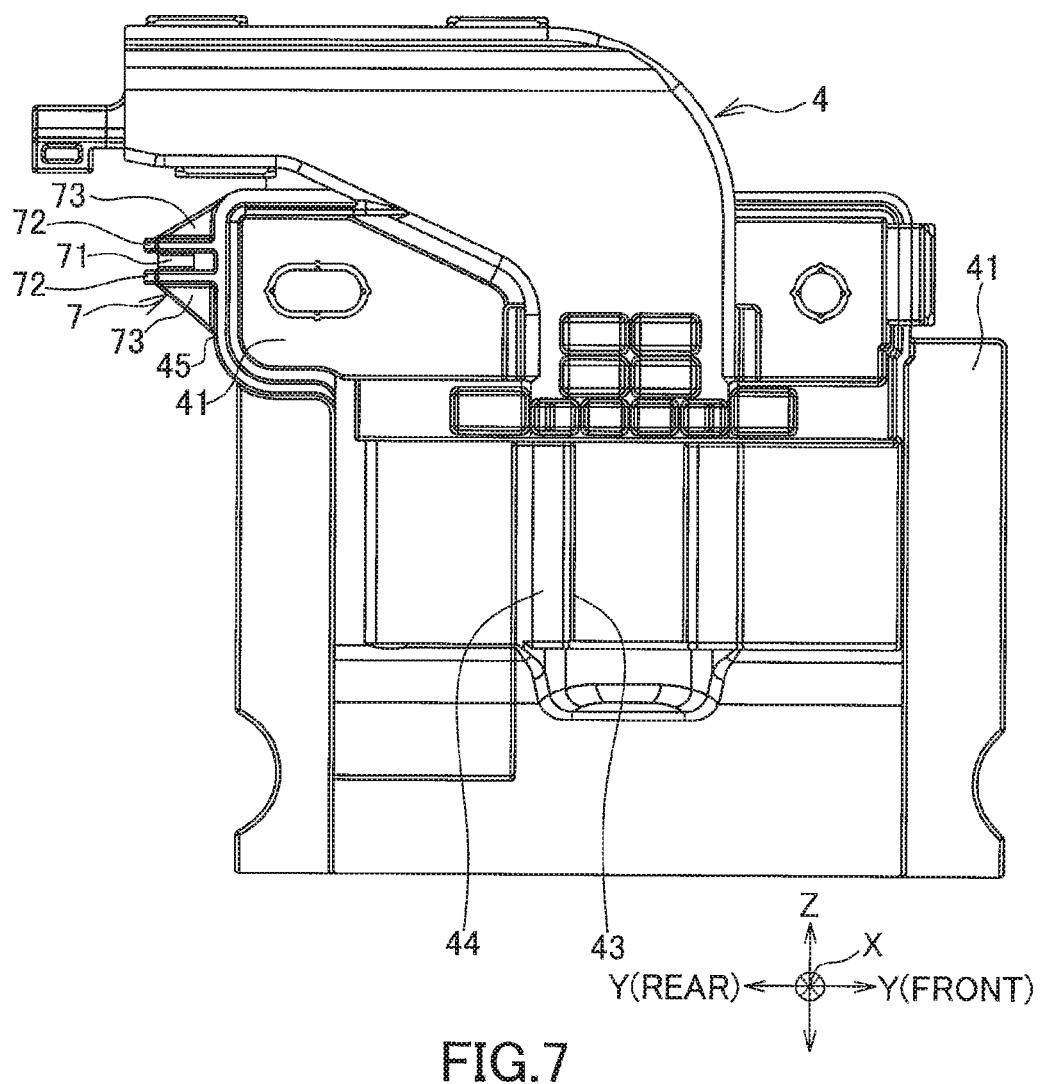
FIG. 7 is a side view showing the door-side holding portion.

As shown in FIGS. 4 and 7, the door-side engaged portion 7 is provided at a corner portion on one end side in the X direction and on the rear side in the Y direction of the door-side support member 41.

Figure 8:
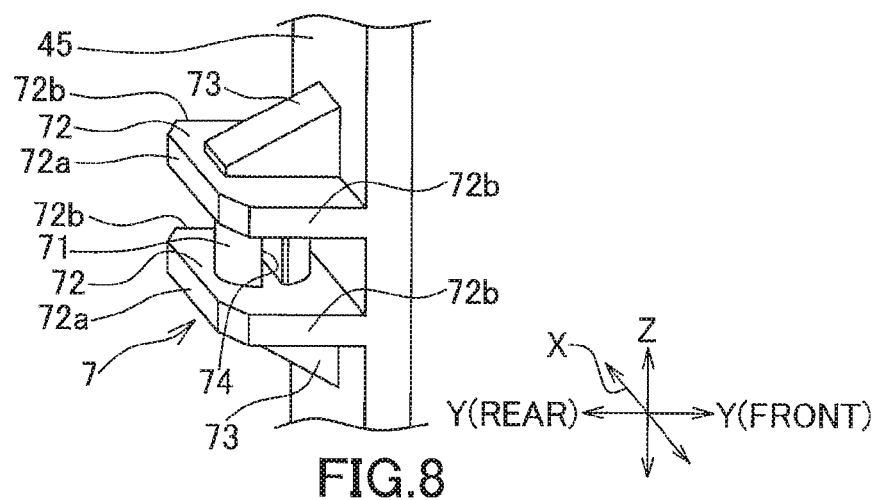
FIG. 8 is a perspective view showing a door-side engaged portion provided in the door-side holding portion.
Figure 9:
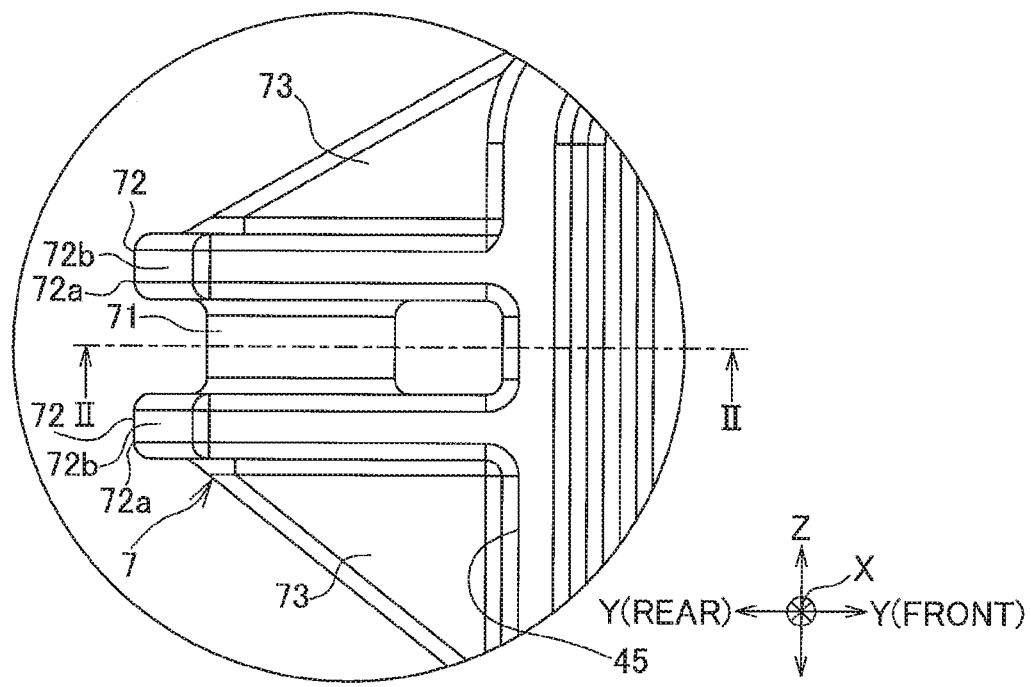
FIG. 9 is a side view showing the door-side engaged portion.
Figure 10:
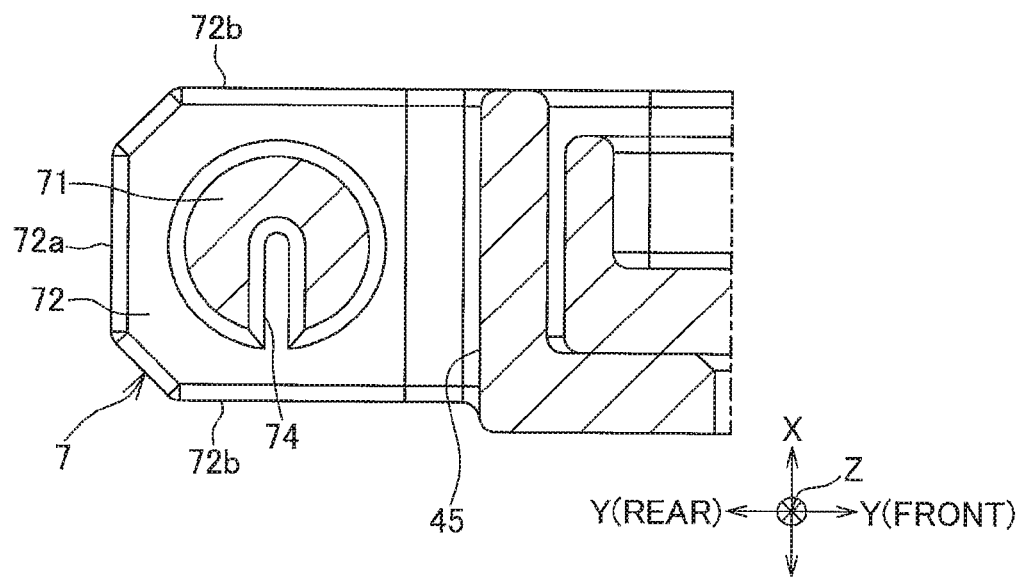
FIG. 10 is a cross-sectional view taken along the line II-II in FIG. 9.

As shown in FIGS. 8 to 10, the door-side engaged portion 7 includes a cylindrical portion 71 that can be inserted into the insertion hole 63 of the vehicle-body-side engaging portion 6, a pair of rectangular opposing plates 72, 72 opposing in the Z direction, and a pair of reinforcing portions 73, 73 reinforcing the pair of opposing plates 72, 72. The cylindrical portion 71 stands in the Z direction so as to have the substantially central portion of each opposing plate 72 as its axis, and is spaced backward in the Y direction from a rear end face 45 orthogonal to the Y direction of the door-side support member 41. A notch 74 is formed on the cylindrical portion 71 extending to an entire length in the axial direction of the cylindrical portion 71 for elastically deforming the cylindrical portion 71 in a circumferential direction. The notch 74 is formed by cutting out a part of the periphery of the cylindrical portion 71 from the center of the cylindrical portion 71. The pair of opposing plates 72, 72 is continuous with the upper end and the lower end in the Z direction of the cylindrical portion 71, and is formed to have a dimension in the opposing direction (Z direction) substantially equal to the thickness of the plate-shaped portion 61 of the vehicle-body-side engaging portion 6.

Next, a procedure for assembling the power supply device 1 in the load state will be described. One end of the corrugated tube 20 is held by the vehicle-body-side harness holding portion 34 in the vehicle-body-side holding portion 3, and the other end of the corrugated tube 20 is held by the door-side harness holding portion 44 in the door-side holding portion 4. In this state, while bending the wire harness 2 in the allowable direction of the corrugated guide 21, as shown in FIG. 4, the vehicle-body-side engaging portion 6 and the door-side engaged portion 7 are brought close to each other in the Y direction. At this time, the vehicle-body-side rocking member 33 of the vehicle-body-side holding portion 3 is provided so that the vehicle-body-side rocking shaft 32 is in the Z direction, and the vehicle-body-side harness holding portion 34 is directed to the other side in the X direction. Further, the door-side rocking member 43 in the door-side holding portion 4 is provided so that the door-side rocking axis is in the Z direction, and the door-side harness holding portion 44 faces the front end side in the Y direction.

Figure 11:
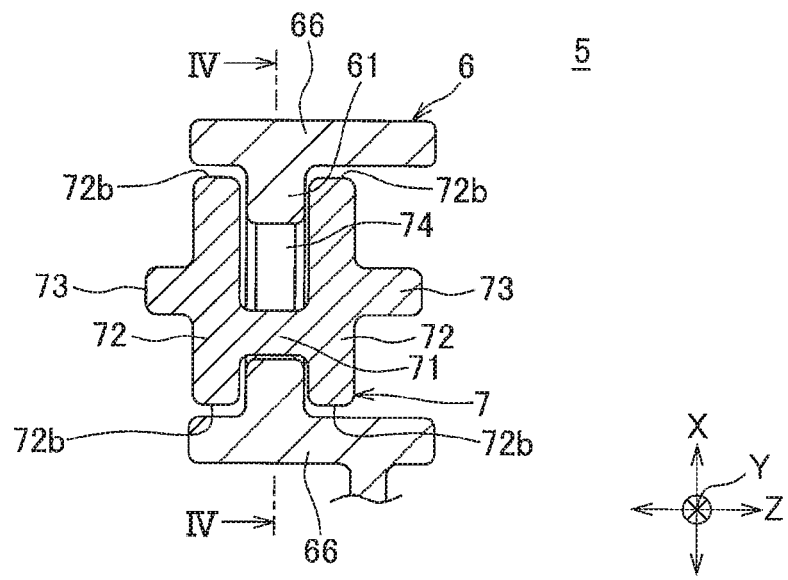
FIG. 11 is a cross-sectional view taken along the line III-III in FIG. 1.
Figure 12:
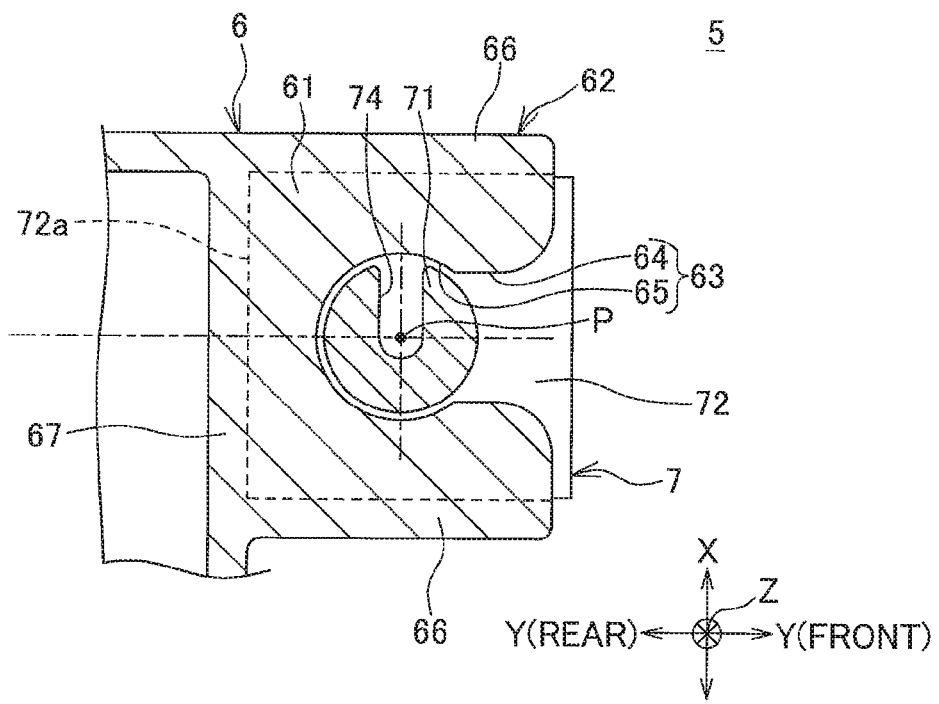
FIG. 12 is a cross-sectional view taken along the line IV-IV in FIG. 11.

By bringing the vehicle-body-side engaging portion 6 and the door-side engaged portion 7 closer to each other in the Y direction, the cylindrical portion 71 of the door-side engaged portion 7 contacts the entrance portion 65 of the insertion hole 63 of the vehicle-body-side engaging portion 6. As the vehicle-body-side engaging portion 6 and the door-side engaged portion 7 are further moved closer to each other, the cylindrical portion 71 is once elastically deformed by the notch 75 and passes through the entrance portion 65. Then, as shown in FIGS. 11 and 12, the cylindrical portion 71 is inserted into the circular portion main body 64. Further, as shown in FIGS. 11 and 12, while the cylindrical portion 71 is inserted in the insertion hole 63, the plate-shaped portion 61 of the body-side engaging portion 6 is inserted into the pair of opposing plates 72, 72 of the door-side engaged portion 7, a rear end surface 72*a* of each of the opposing plates 72, 72 faces the rear wall 67 of the enclosing wall 62, and the left and right end faces 72*b*, 72*b* of each opposing plate 72, 72 respectively face the left and right walls 66 of the enclosing wall 62. In this manner, the vehicle-body-side engaging portion 6 and the door-side engaged portion 7 are engaged with each other. While the vehicle-body-side engaging portion 6 and the door-side engaged portion 7 are engaged with each other, the corrugated guide 21 is bent in the allowable direction so that the axis of the corrugated tube 20 is positioned on the same plane. Further, while the vehicle-body-side engaging portion 6 and the door-side engaged portion 7 are engaged with each other, displacements in the X direction, the Y direction, and the Z direction are restricted between the vehicle-body-side holding portion 3 and the door-side holding portion 4.

According to the above embodiment, in a state where the vehicle-body-side holding portion 3 holds one end of the corrugated tube 20 (exterior member) and the door-side holding portion 4 holds the other end of the corrugated tube 20, the connecting portion 5 is provided capable of connecting and disconnecting the vehicle-body-side holding portion 3 and the door-side holding portion 4 from each other while bending the corrugated tube 20. According to this, the corrugated tube 20 is held in a curved state by the vehicle-body-side holding portion 3 and the door-side holding portion 4. That is, by holding the corrugated tube 20 in a curved state, the rigidity of the corrugated tube 20 can be obtained, so that it is possible to suppress the deformation of the corrugated tube 20 when transported in the load state or when a worker grips and removes the exterior member from the returnable box 20.

Further, the axis of the corrugated tube 20 is curved so as to be located on the same plane in a state where the vehicle-body-side holding portion 3 and the door-side holding portion 4 are connected by the connecting portion 5. According to this, since it is difficult for a load other than the predetermined direction to be applied to the corrugated tube 20 in the load state, deformation of the corrugated tube 20 can be suppressed.

In addition, the corrugated tube 20 (exterior member) includes a corrugated guide 21 which is externally mounted on the electric wire, allows the electric wire to bend in a predetermined allowable direction and restricts the bending of the corrugated tube 20 beyond a predetermined limit state in the opposite regulating direction. The corrugated tube 20 and the corrugated guide 21 are provided so as to be bent in the allowable direction in a state where the vehicle-body-side holding portion 3 and the door-side holding portion 4 are connected by the connecting portion 5. According to this, the corrugated tube 20 is bent in the allowance direction of the corrugated guide 21 while the vehicle-body-side holding portion 3 and the door-side holding portion 4 are connected by the connecting part 5 in the load state, so that due to the rigidity of the corrugated tube 20 and the corrugated guide 21, it is possible to further prevent corrugated tube 20 from being deformed when transported in the load state or when a worker grips and removes an exterior member from the returnable box 20.

Incidentally, the present invention is not limited to the above-described embodiment, but includes other configurations and the like that can achieve the object of the present invention, and the following modified examples are also included in the present invention.

In the above embodiment, each end portion of the corrugated tube 20 (exterior member) is held by the vehicle-body-side holding portion 3 and the door-side holding portion 4. In addition, although the corrugated guide 21 is provided between the electric wire and the corrugated tube 20, the present invention is not limited thereto. The corrugated guide may be omitted. In addition, although the corrugated tube is used as the exterior member, the present invention is not limited to this. Any member may be used as the exterior member as long as it is provided in a tubular shape. According to this, substantially the same effect as the above-described embodiment is exerted.

Although the best configurations, methods, and the like for carrying out the present invention are disclosed in the above description, the present invention is not limited thereto. Namely, while the invention has been particularly shown and described with particular reference to certain embodiments thereof, it will be apparent to those skilled in the art that in material, quantity, and other detailed configurations, various modifications and variations can be devised without departing from the spirit and scope of the invention. Accordingly, the description that limits the shape, material, etc. disclosed above is exemplarily described for easy understanding of the present invention, and does not limit the present invention, so the description in the name of the parts with limitations on part or all of the restrictions on their shapes, materials and the like is included in the present invention.

REFERENCE SIGNS LIST

1 power supply device
5 connecting portion
6 vehicle-body-side engaging portion
7 door-side engaged portion
20 corrugated tube (exterior member)
21 corrugated guide

The invention claimed is:

1. A power supply device for supplying power from a vehicle body to a sliding door comprising:
an exterior member;
a vehicle-body-side holding portion for holding one end of the exterior member, comprising an insertion hole and a rocking member that holds a first end portion of the external member, wherein the rocking member is swingably supported by a support member in an opening and closing direction of the sliding door around a rocking shaft; and
a door-side holding portion for holding the other end of the exterior member, comprising a cylindrical portion that can be inserted into the insertion hole,
wherein a notch is formed in the cylindrical portion extending to an entire length in the axial direction of the cylindrical portion,
wherein the power supply device further comprises: a connecting portion that can connect and disconnect the vehicle-body-side holding portion and the door-side holding portion while bending the exterior member in a state in which the vehicle-body-side holding portion holds the one end of the exterior member and the door-side holding portion holds the other end of the exterior member,
wherein the exterior member contains a tubular member and a plurality of interior members, arranged radially within the tubular member, that form a corrugated guide.

2. The power supply device as claimed in claim 1,
wherein the exterior member is curved such that an axis of the exterior member is located on the same plane in a state in which the vehicle-body-side holding portion and the door-side holding portion are connected by the connecting portion.

3. The power supply device as claimed in claim 1,
wherein the corrugated guide is externally mounted on an electric wire and allows the electric wire to be bent in a predetermined allowable direction and regulates a curvature exceeding a predetermined limit state in a restricting direction which is an opposite side, and
wherein the exterior member is provided so as to be curved in the allowable direction in a state in which the vehicle-body-side holding portion and the door-side holding portion are connected by the connecting portion.

4. The power supply device as claimed in claim 2,
wherein the corrugated guide is externally mounted on an electric wire and allows the electric wire to be bent in a predetermined allowable direction and regulates a curvature exceeding a predetermined limit state in a restricting direction which is an opposite side, and
wherein the exterior member is provided so as to be curved in the allowable direction in a state in which the vehicle-body-side holding portion and the door-side holding portion are connected by the connecting portion.

* * * * *